(No Model.)
R. H. DOWLING.
CAR COUPLING.
No. 410,542. Patented Sept. 3, 1889.
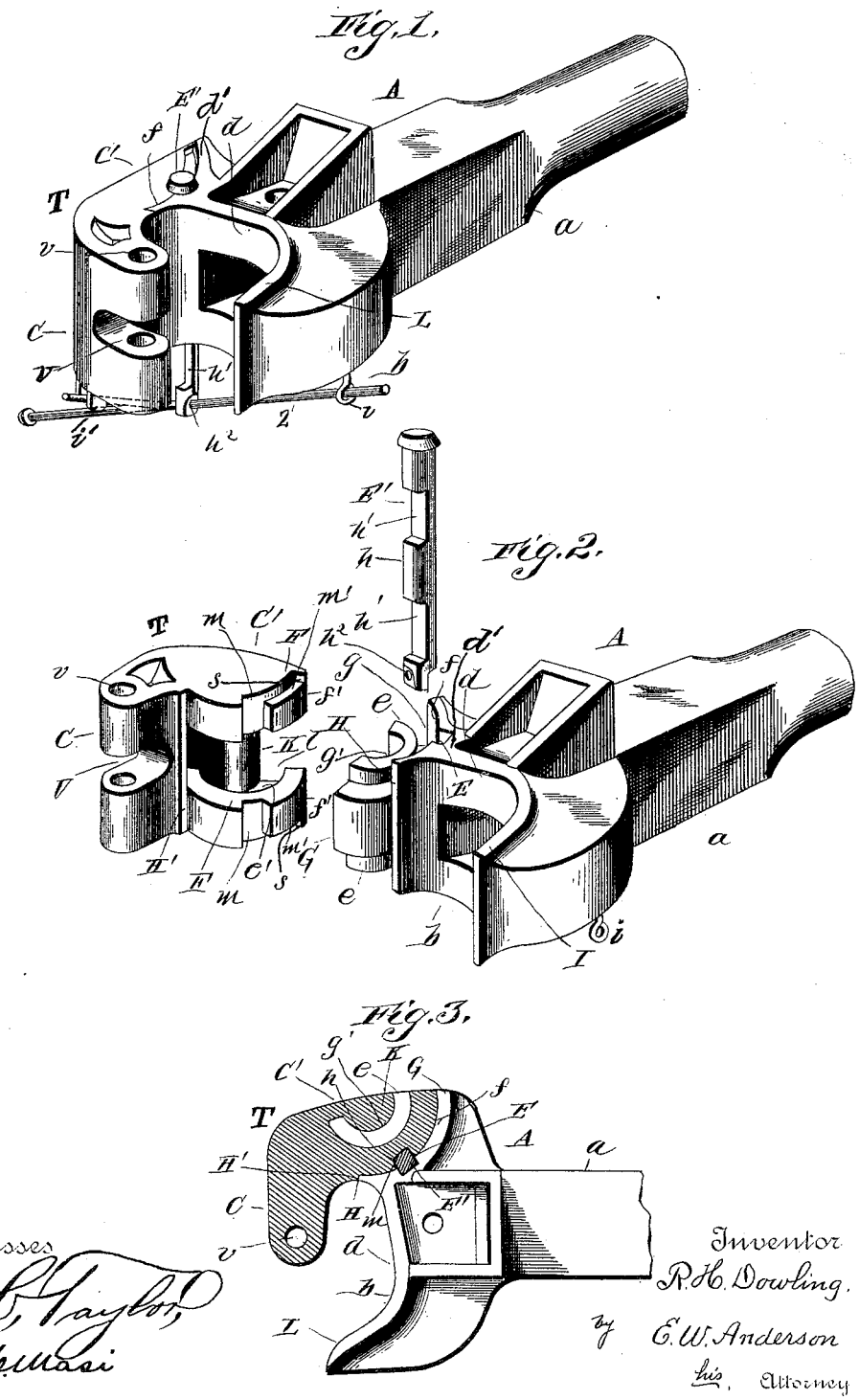

UNITED STATES PATENT OFFICE.

ROBERT H. DOWLING, OF NEWARK, OHIO, ASSIGNOR OF TWO-THIRDS TO CHARLES FOLLETT AND CHARLES H. FOLLETT, BOTH OF SAME PLACE.

CAR-COUPLING.

SPECIFICATION forming part of Letters Patent No. 410,542, dated September 3, 1889.

Application filed April 8, 1889. Serial No. 306,391. (No model.)

*To all whom it may concern:*

Be it known that I, ROBERT H. DOWLING, a citizen of the United States, and a resident of Newark, in the county of Licking and State of Ohio, have invented certain new and useful Improvements in Devices for Coupling Cars; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a perspective view. Fig. 2 is a view of the head and draw-bar separated. Fig. 3 is a detail view partly in section.

In the accompanying drawings, the letter A designates the draw-bar, which consists of the stem $a$ and the head $b$, having the concave front face $d$, bounded on one side by the guide-flange L and terminating at the other side in the stop-shoulder H, which forms the forward edge of the wall of the draw-head, from the concave lateral face $f$ of which projects the arc-shaped bearing-shank G, having the circular bearing-flange $e$ on its upper and lower faces. Between these flanges $e$ and the concave face $f$ are the circular bearing-channels $g$. Through the draw-head vertically extends the locking-pin aperture or bearing-slot E, one part of which extends in the wall $d'$ and the other portion of which notches the inner part of the bearing-shank or joint projection G. The pin E', which fits in the slot E, is prismatic, being formed with angular stops or corner edges at $h$ and with notches at $h'$. The pin is designed to be provided with a bearing $h''$ to engage an arm of the operatng-lever. The arc-shank G is T form in section and is laterally and outwardly concave, as indicated in the drawings, and it is formed with a concave center bearing $g'$ to receive the convex inner journal-rib K of the coupling-hook C, the shank portion C' of which is recessed at $l$ to provide a way for the projecting portion of the arched shank G, the recess $l$ having the arc-shaped channels $e'$ within the upper and lower convex flanges F to receive the circular bearing-flanges $e$ of the arc-shaped shank G of the head, said bearing-flanges covering in the shank G above and below. The channels $e'$ are open at their rear ends, so that the hook-arm can be readily engaged with the bearings of the arc-shank G. In the convex faces $f'$ of the flanges F are provided the pin-channels $m$ and the rabbeted bearings $m'$, extending therefrom. At the inner ends of the convex faces $f'$, and at the root of the hook-head T in rear of its middle portion, is formed the clip stop-shoulder H', which, when the hook is in locked position, is designed to engage the stop-shoulder H of the draw-head. The hook-head T is usually centrally notched at V, to receive an ordinary coupling-link when necessary, and is provided with the pin-bearings $v$ in its end portion. The hook-arm turns upon the circular bearings of the lateral shank projection G of the head, its outward movement in opening to receive the hook of the opposite draw-bar being limited by the engagement of the stops of the locking-pin with the stops $s$ of the hook-arm when said locking-pin is in raised position, so that the convex flanges F of the hook-arm can pass in the notches $h'$ of said pin. When the hook is in closed position, the notched pin-channels $m$ of the convex flanges F coincide with the notches of the wall $d'$ and with the pin-slot through the projection G, and the pin is allowed to fall to its locking position, in which its squared portions $h$ engage the opposed notch-bearings of the wall $d'$ and the shank G and hold the hook securely in engaged position. The shoulders H H' of the draw-head and coupling-hook are located in rear of the middle portion of the hook-head and abut when the hook is in closed position, and serve to materially assist in withstanding the shock or concussion when the cars come together. The notches of the locking-pin and the engaging portions of the shank G of the draw-head prevent the pin from being withdrawn when the hook is in open position. Under the draw-head, and connected to eyes or bearings $i$ thereof, is the uncoupling-lever Z, which engages the bearing $i'$ in the lower end of the locking-hook T, and, projecting laterally from the draw-head, enables the brakeman to readily raise the locking-pin to uncoupling position and also to open or close the hook, if necessary, when the locking-pin is in a raised position. This operating-lever and its bearings are all designed to be connected to the draw-head, so that whenever the draw-bar is pulled out from its seat the lever attachment is removed with it, and its relation to the locking-pin is undisturbed.

Having described this invention, what I claim and desire to secure by Letters Patent, is—

1. In a draw-bar, the lateral joint projection and the inner concussion-shoulder of the draw-head, in combination with the coupling-hook engaging bearings of said joint projection, and its concussion-shoulder in rear of the middle portion of the hook-head, adapted to engage the concussion-shoulder of the draw-head when the hook is closed, substantially as specified.

2. In a draw-bar, the lateral outwardly-concave joint projection having circular bearing-flanges, in combination with the hook recessed to receive the joint projection and its bearing-flanges, and having upper and lower circular flanges engaging the circular flanges of the joint projection of the draw-head, and covering in the same above and below, substantially as specified.

3. In a draw-bar, the T-form arc-shaped lateral bearing-shank or joint projection, in combination with the recessed coupling-hook and its circular flanges covering in the T-form bearing-shank above and below the pin-slot of said projection, the pin-receiving notches of the draw-head in line with said slot, the pin-receiving channels of the hook-shank, the rabbeted bearings communicating therewith, and the notched prismatic locking-pin, substantially as specified.

4. In a car-coupling, the combination, with the draw-head having a concave front including a lateral curved guide-flange and the connected coupling-hook, of the lateral concussion-shoulder H of said concave front opposite the curved guide-flange and extending across the draw-head from top to bottom, substantially as specified.

5. In a draw-bar, the combination, with the T-form arc-shaped joint projection having a pin-slot extending vertically through it and the pin-receiving extensions thereof in the concave wall of said joint projection, of the circularly flanged and recessed coupling-hook shank, the pin-receiving channels thereof, and the rabbets extending from said channels, the notched prismatic locking-pin, and the stops of the shank of the coupling-hook adapted to engage the same, substantially as specified.

In testimony whereof I affix my signature in presence of two witnesses.

ROBERT H. DOWLING.

Witnesses:
N. L. HELPHREY,
G. C. DAUGHERTY.